United States Patent [19]
Denk et al.

[11] Patent Number: 5,323,075
[45] Date of Patent: Jun. 21, 1994

[54] HALL EFFECT SENSORS EMBEDDED WITHIN TWO-POLE TOOTHLESS STATOR ASSEMBLY

[75] Inventors: Joseph Denk; Richard J. Grant, both of Los Angeles, Calif.

[73] Assignee: AlliedSignal Inc, Morris Township, Morris County, N.J.

[21] Appl. No.: 987,482

[22] Filed: Nov. 20, 1992

[51] Int. Cl.$^5$ .................. H02K 11/00; H02K 5/28; H02K 1/12
[52] U.S. Cl. .................. 310/68 B; 310/86; 310/254
[58] Field of Search .............. 310/43, 68 B, 68 R, 310/254, 268, 258, DIG. 3, 85, 86

[56] References Cited

U.S. PATENT DOCUMENTS

| | | | |
|---|---|---|---|
| 3,988,024 | 10/1976 | Watanabe et al. | 310/268 |
| 4,443,906 | 4/1984 | Tucker et al. | 310/268 |
| 4,594,524 | 6/1986 | Sudo | 310/68 R |
| 4,658,162 | 4/1987 | Koyama et al. | 310/68 R |
| 4,667,123 | 5/1987 | Denk et al. | 310/156 |
| 4,728,833 | 3/1988 | Shiraki et al. | 310/68 R |
| 4,733,118 | 3/1988 | Mihalko | 310/156 |
| 4,837,921 | 6/1989 | Tassinario | 310/216 |
| 5,142,180 | 8/1992 | Moore et al. | 310/43 |
| 5,159,218 | 10/1992 | Murray et al. | 310/68 B |

Primary Examiner—Steven L. Stephan
Assistant Examiner—C. La Balle
Attorney, Agent, or Firm—Robert A. Walsh; Joseph R. Black

[57] ABSTRACT

A two-pole toothless PM machine employs Hall effect sensors to indicate the position of the machine's rotor relative to power windings in the machine's stator. The Hall effect sensors are located in the main magnetic air gap underneath the power windings. The main magnetic air gap is defined by an outer magnetic surface of the rotor and an inner surface of the stator's flux collector ring.

12 Claims, 2 Drawing Sheets

HALL EFFECT SENSORS EMBEDDED WITHIN TWO-POLE TOOTHLESS STATOR ASSEMBLY

The invention described herein was made in the performance of work under NASA Contract No. NAS9-17900, and is subject to the provisions of Section 305 of the National Aeronautics and Space Act of 1958, as amended (42 (U.S.C. 2457).

BACKGROUND OF THE INVENTION

This invention relates in general to electrical machine systems and in particular to the location of Hall effect sensors relative to the stator assembly of a two-pole toothless permanent magnet brushless dc machine.

A brushless dc motor system typically consists of a motor, a solid-state inverter, a controller and a rotor position sensing system. The motor includes a permanent magnet rotor and a stator whose polyphase power windings surround the rotor. Under command from the controller, the inverter energizes selected phase windings at the correct time and sequence to generate a stator mmf field that reacts with the rotor's flux field, causing the rotor to rotate.

The rotor position sensing system generates with signals indicating the position of the rotor relative to the phase windings. The controller decodes these position signals into commutation commands which command the inverter to energize the phase windings at the correct time and sequence.

The rotor position sensing system can include proximity probes and a back emf generator. During motor startup, the rotor position signals are generated by the proximity probes. Once the motor reaches roughly ten percent of maximum rated speed, however a switch is made to the back emf generator which generates the rotor position signals.

The proximity probes sense the position of a cam that is mounted about one end of the motor's shaft, external to the motor. However, this design has the unwanted effect of increasing the axial length of the motor. Further, the proximity probes must be adjusted for precise commutation.

Instead of using proximity probes, the rotor position sensing system can use Hall effect sensors. The Hall effect sensors are mounted underneath stator end turns where they work off rotor end leakage flux. The use of Hall effect sensors overcomes the problem of axial length. For small machines, however, the end leakage flux may not be sufficient for the Hall effect sensors to operate reliably.

SUMMARY OF THE INVENTION

This disadvantage is overcome by a system comprising a toothless machine, Hall effect sensors for indicating the position of the machine's rotor relative to its stator, and means for energizing power windings of the stator in response to position signals from the Hall effect sensors. The Hall effect sensors are embedded under the power windings of the stator and located in the main magnetic air gap between the rotor and stator. In this location, the Hall effect sensors are exposed to a greater number of flux lines than they would be if located under the stator end turns.

This design is limited to machines whose current ratings are low and whose operating temperatures do not exceed the maximum allowable temperature rating of the Hall effect sensors.

When embedded in the stator's winding support structure, the Hall effect sensors do not have to be adjusted. Resulting is easy installation and packaging.

DETAILED DESCRIPTION OF THE INVENTION

Figure 1:
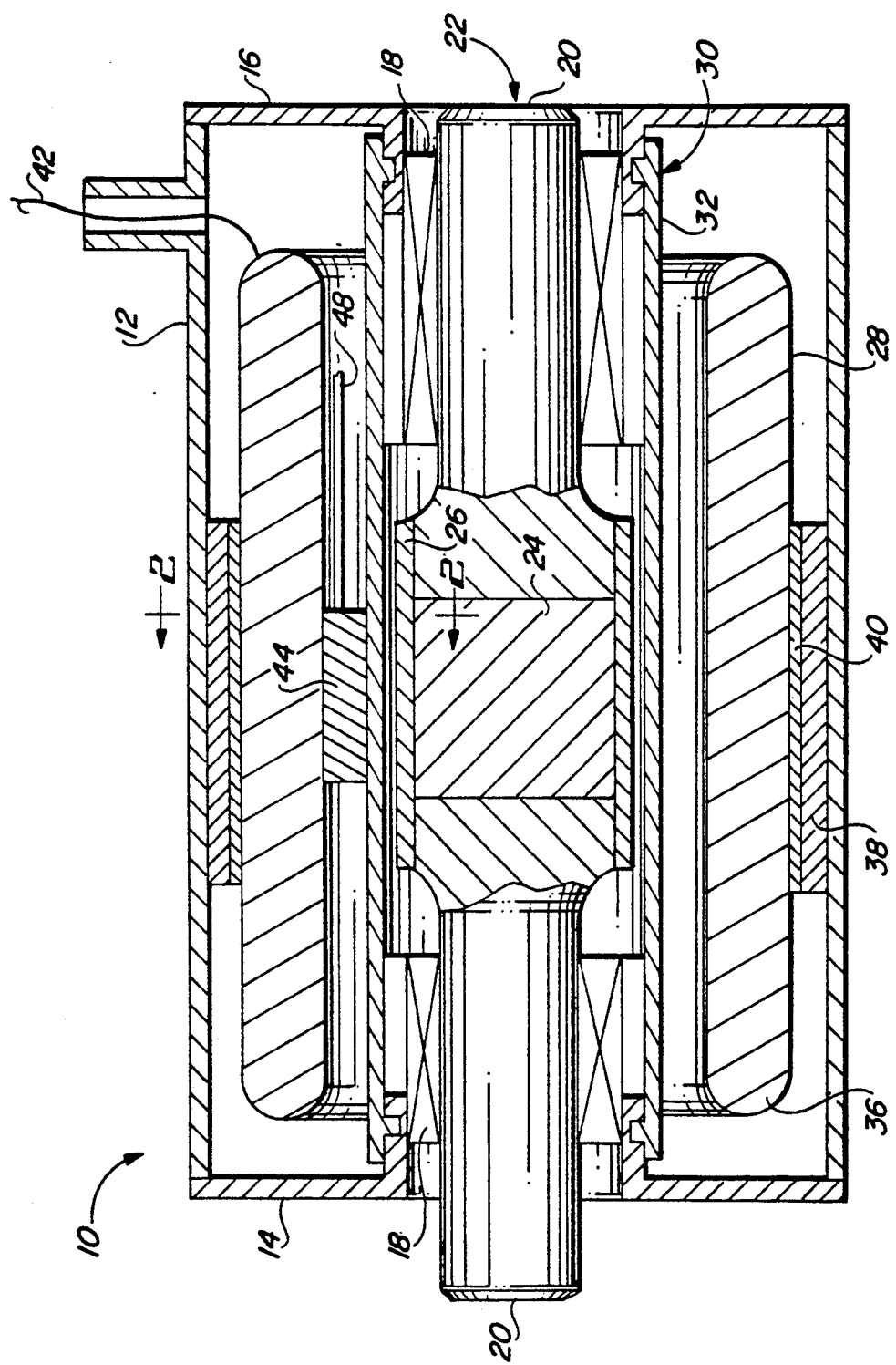
FIG. 1 is a cross-sectional view of a two-pole toothless PM machine including a stator embodying the present invention.
Figure 2:
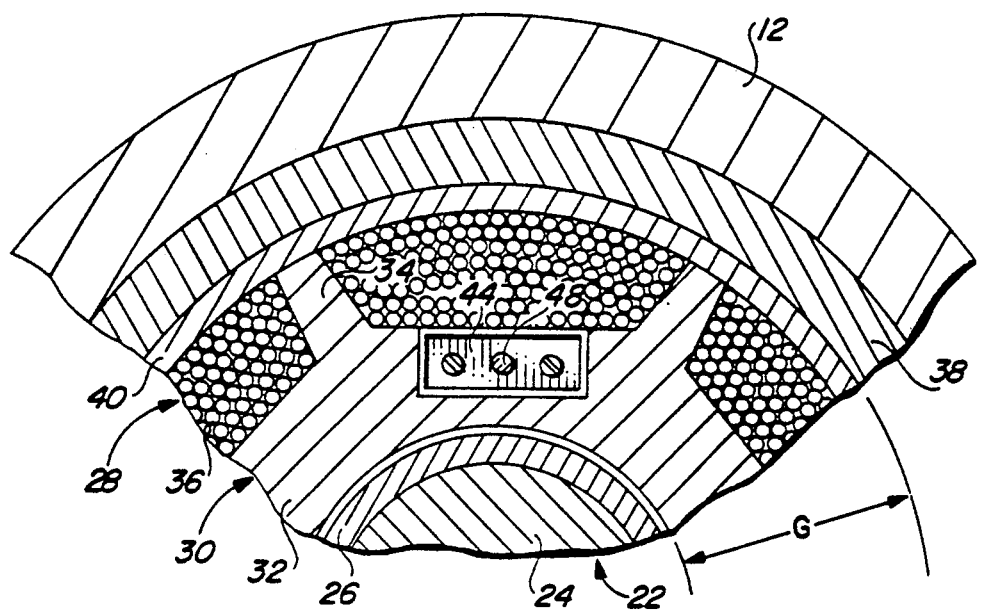
FIG. 2 is a fragmentary cross-sectional view, taken along lines 2—2, of the machine shown in FIG. 1.

FIGS. 1 and 2 show a two pole toothless machine 10 including a main housing 12 having front and rear endbells 14 and 16 which carry bearings 18. Journalled in the bearings 18 are stub shafts 20 of a rotor 22. The shafts 20 rotate a cylindrical two pole permanent magnet 24 that is magnetized diametrically. Surrounding the magnet 24 is a retaining hoop 26. Construction of the rotor 22 is disclosed by Joseph Denk and Kenneth Wuertz in U.S. Pat. No. 4,667,123 ("TWO POLE PERMANENT MAGNET ROTOR CONSTRUCTION FOR TOOTHLESS STATOR ELECTRICAL MACHINE") and U.S. Pat. No. 4,741,094 ("TWO POLE PERMANENT MAGNET ROTOR CONSTRUCTION METHOD"), both of which patents are incorporated herein by reference.

Surrounding the rotor 22 is a stator 28 whose winding support structure 30 includes a cylindrical boreseal 32 and fins 34 extending radially outward from the boreseal 32. Power windings 36 are prewound in a conventional manner and installed on the support structure 30. For a two-pole, three phase machine having six stator slots, there are three sets of two coils. The portions of the power windings 36 extending axially beyond the support structure 30 are known as end turns. The support structure 30 is surrounded by an iron flux collector ring 38, which provides a flux return path for the flux from the rotor 22. Disposed between the support structure 30 and flux collector ring 38 is insulation 40. Electrical leads 42, hermetically sealed to the housing 12, supply power to and from the power windings 38. Construction of the stator 28 is disclosed by Joseph Denk in U.S. Pat. No. 4,709,180 ("TOOTHLESS STATOR CONSTRUCTION FOR ELECTRICAL MACHINES") and U.S. Pat. No. 4,852,245 ("TOOTHLESS STATOR ELECTRICAL MACHINE CONSTRUCTION METHOD"), both of which patents are incorporated herein by reference. The patents disclosing stator and rotor construction for a two pole toothless machine are assigned to Allied Signal, Inc., the assignee of the present invention.

The outer surface of the permanent magnet 24 and the inner surface of the flux collector ring 38 define a main magnetic air gap G. Flux is much greater in the main magnetic air gap G than at the end turns.

Embedded in the magnetic air gap G under the power windings 36 in the electromechanically correct position are Hall effect sensors 44. For a three phase, two.pole machine, the Hall effect sensors 44 are spaced apart by 120 electrical and mechanical degrees. For redundancy, a second set of sensors is employed, shifted from the primary Hall effect sensors 44 by 60 electrical and mechanical degrees.

The Hall effect sensors 44 are located in the main magnetic air gap G where the flux is greatest. Typically, this location is midway between the two ends of the rotor's permanent magnet 24.

Figure 3:
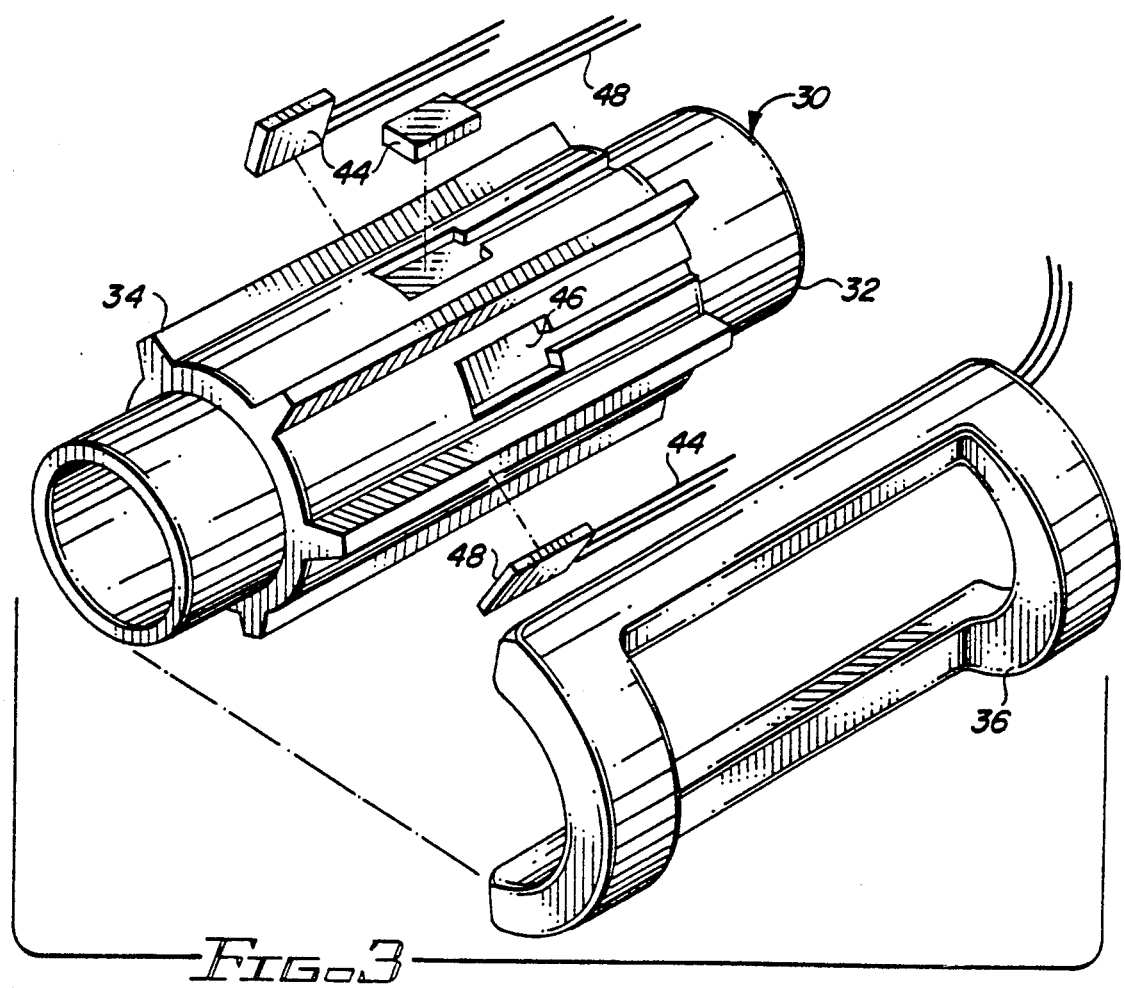
FIG. 3 is an exploded view of a portion of the stator shown in FIG. 1.

Referring now to FIG. 3, the Hall effect sensors 44 are mounted on the winding support structure 30. When the winding support structure 30 is being fabricated, the boreseal 32 is provided with extra thickness at the locations where the Hall effect sensors 44 are to be mounted. The extra thickness allows slots 46 to be machined into the boreseal 32, which slots 46 accommodate the sensors 44 and their leads 48. The dimensions of the slots 46 are selected according to the geometry of the Hall effect sensors 44. After the Hall effect sensors 44 are placed in their slots 46, the insulation 40, power windings 36 and flux collector ring 36 are installed. The power windings 38 retain the Hall effect sensors 44 in their slots 46.

The leads 48 from the Hall effect sensors 44 can be brought out from the machine 10 to an external connector (not shown) for connection to the machine's controller. Alternatively, the leads 48 can be connected directly to a controller that is mounted directly on the machine 10. Such a machine with integral controller is disclosed in Murry et al. U.S. Pat. No. 5,159,218, which is incorporated herein by reference. This patent is also assigned to Allied Signal, Inc.

The Hall effect sensors 44 cannot be operated above their maximum allowable temperature rating. Nor can motor input current waveshape contain high energy harmonics. Overtemperature and high energy harmonics will cause false triggering of the Hall effect sensors 44. As a result, the machine 10 will not be able to commutate properly.

Thus, the present invention is limited to low power, fractional horsepower machines, where the energy harmonics are low and where temperatures in the power windings 36 do not exceed the maximum allowable temperature rating of the Hall effect sensors 44. For "HALLOGIC" bipolar latching-type Hall effect sensors, type OHS3075U, available from Optek Technology, Inc. of Carrollton, Tex., the operating temperature ranges from −65° C. to +150° C.

Several tradeoffs are involved with the design of the machine 10. Among its disadvantages, the machine 10 is somewhat bigger than conventional machines, since the power windings 36 and flux collector ring 38 are moved further away from the surface of the rotor's permanent magnet 24. Consequently, there are fewer flux lines in the main magnetic air gap G because the air gap G becomes larger. To increase the number of flux lines cutting through the power windings 36, the length of the rotor's permanent magnet 24 must be increased. Also, more turns must be added to the power windings 36, which increases resistance and, therefore, lowers the efficiency of the machine 10.

Among the advantages, the Hall effect sensors 44 operate with greater reliability because they work off of the flux in the main magnetic air gap G instead of the end flux leakage. This design is especially suitable for small machines whose end flux leakage might not be sufficient to be sensed by the Hall effect sensors 44. Further, the machine 10 is easier to package and assemble because the Hall effect sensors 44 do not have to be adjusted.

It will be understood that these embodiments are merely exemplary and that a person skilled in the art may make many variations and modifications without departing from the spirit and scope of the invention. All such modifications are intended to be included within the scope of the invention as defined in the appended claims.

We claim:

1. A system comprising:
   a toothless machine including a rotor, and a stator having power windings and, a winding support structure having a boreseal, said stator and said rotor defining a main magnetic air gap;
   Hall effect sensors embedded under said power windings of said stator in said boreseal and located in said main magnetic air gap; and
   means for energizing said power windings of said stator in response to position signals from said Hall effect sensors.

2. The system of claim 1, wherein said boreseal includes thickened portions having slots for receiving said Hall effect sensors.

3. The system of claim 2, wherein said winding support structure includes fins extending radially outward from said boreseal, wherein said power windings are laid between said fins, and wherein said Hall effect sensors are retained in their slots by said power windings.

4. The system of claim 1, wherein said rotor includes a permanent magnet, and wherein said Hall effect sensors are located about midway between opposite ends of said magnet.

5. The system of claim 1, wherein said energizing means includes an inverter and controller mounted directly to said machine, and wherein leads from said Hall effect sensors are connected directly to said controller.

6. The system of claim 1, wherein said machine is a fractional horsepower machine.

7. A toothless machine comprising:
   a rotor including a permanent magnet;
   a stator including a winding support structure, power windings that are supported by said winding support structure and a flux collector ring surrounding said power windings, an outer surface of said permanent magnet and an inner surface of said flux collector ring defining a main magnetic air gap; and
   Hall effect sensors located in said main magnetic air gap about midway between opposite ends of said permanent magnet and embedded within a boreseal of said winding support structure at electromagnetically correct angles.

8. The machine of claim 7, wherein said boreseal includes thickened portions having slots for receiving said Hall effect sensors.

9. The machine of claim 8, wherein said support structure includes fins extending radially outward from said boreseal, wherein said power windings are laid between said fins, and wherein said Hall effect sensors are retained in their slots by said power windings.

10. A stator assembly, comprising:
    a winding support structure which includes a boreseal
    at least one phase winding supported by said support structure; and
    at least one Hall effect sensor for each said phase winding, each said Hall effect sensor being embedded in said support structure in said boreseal at an electromechanically correct angle.

11. The stator of claim 10, wherein said boreseal includes thickened portions having slots for receiving said Hall effect sensors.

12. The stator of claim 11, wherein said winding support structure includes fins extending radially outward from said boreseal, wherein said power windings are laid between said fins, and wherein said Hall effect sensors are retained in their slots by said power windings.

* * * * *